Oct. 23, 1923.                                                              1,471,479
                          A. G. GLEISSNER
                        COLLAPSIBLE TRAILER
                       Filed Jan. 26, 1922           2 Sheets-Sheet 1
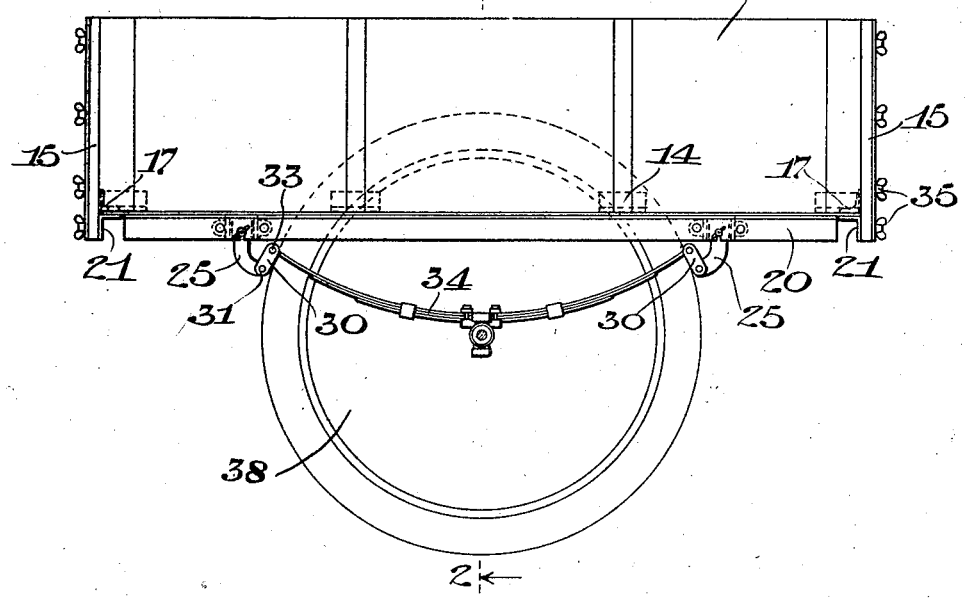
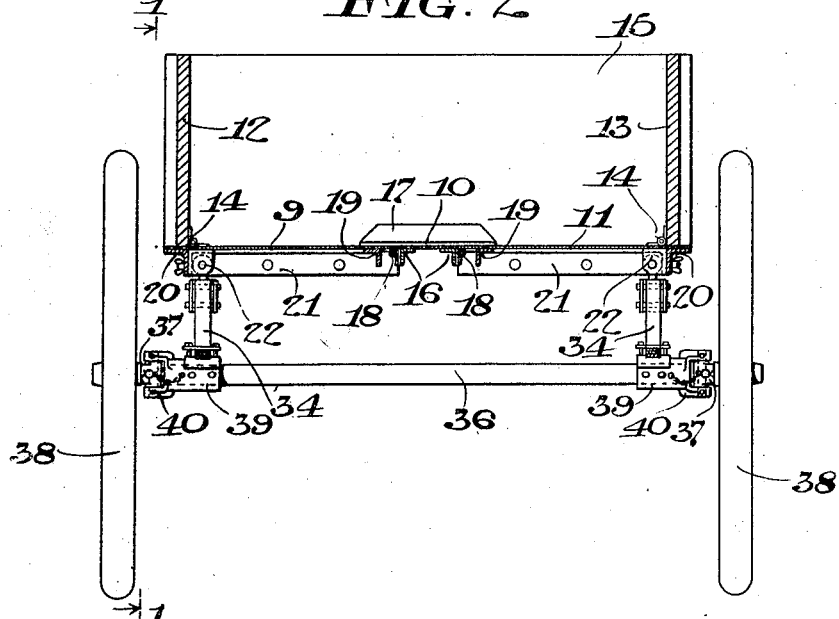
WITNESSES                                                    INVENTOR
                                                         Anton G. Gleissner
                                                       By
                                                              ATTORNEY Oct. 23, 1923.
A. G. GLEISSNER
COLLAPSIBLE TRAILER
Filed Jan. 26, 1922   2 Sheets-Sheet 2
1,471,479
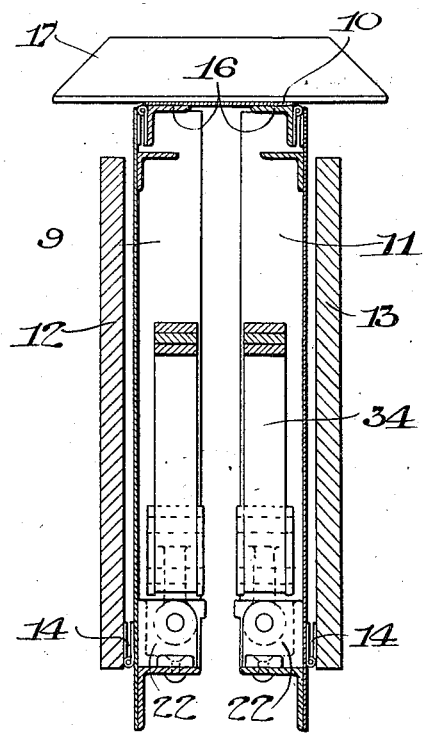
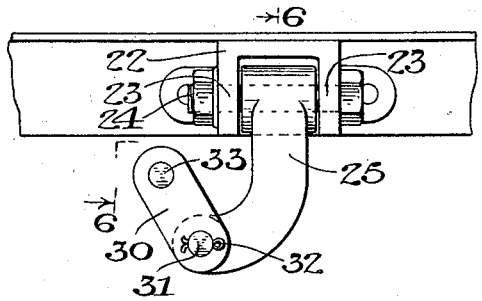
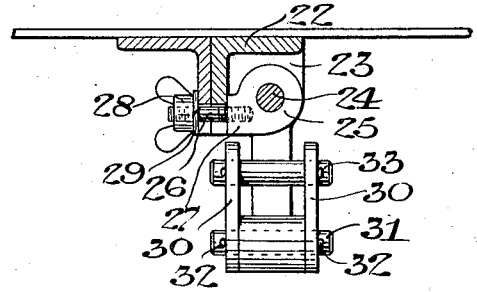
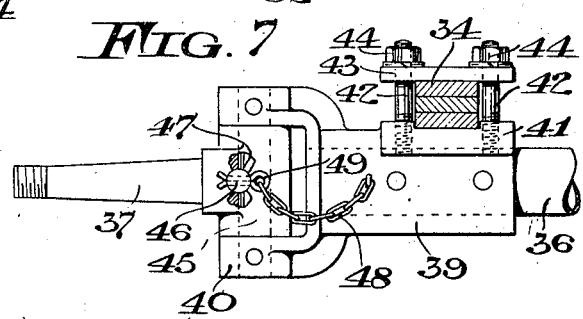
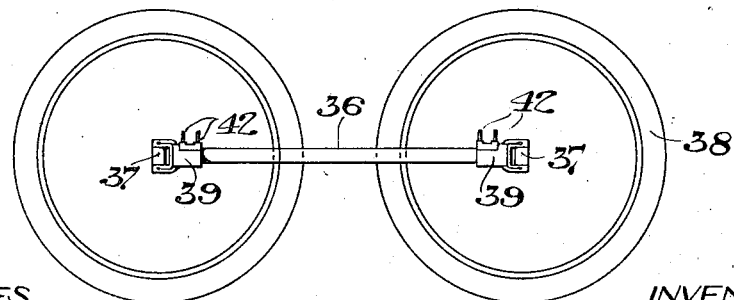
WITNESSES
INVENTOR
Anton G. Gleissner
By R. S. Caldwell
ATTORNEY Patented Oct. 23, 1923.

1,471,479

UNITED STATES PATENT OFFICE.

ANTON G. GLEISSNER, OF MILWAUKEE, WISCONSIN.

COLLAPSIBLE TRAILER.

Application filed January 26, 1922. Serial No. 531,967.

*To all whom it may concern:*

Be it known that I, ANTON G. GLEISSNER, a citizen of the United States, and resident of Milwaukee, in the county of Milwaukee and State of Wisconsin, have invented new and useful Improvements in Collapsible Trailers, of which the following is a description, reference being had to the accompanying drawings, which are a part of this specification.

The invention relates to vehicle trailers.

The principal object of the invention is to provide a collapsible trailer of strong but light weight construction for use with an automotive vehicle, and which trailer may be readily knocked down and carried by the automotive vehicle in any convenient place, as upon its running-board.

With this and other objects in view the invention consists in the trailer and the features of construction thereof hereinafter described and all equivalents.

In the drawings: Fig. 1 is a section taken on the line 1—1 of Fig. 2 of a trailer embodying the invention; Fig. 2 is a section taken on the line 2—2 of Fig. 1; Fig. 3 is a view of the trailer body in collapsed condition; Fig. 4 is a view of the running gear in collapsed condition; Fig. 5 is a detail view of one of the spring hangers; Fig. 6 is a detail sectional view taken on the line 6—6 of Fig. 5; Fig. 7 is an enlarged view of parts shown in Fig. 2.

The body of the trailer has a foldable bottom comprising sections 9, 10 and 11, preferably of sheet metal, and sides 12 and 13 connected by hinges 14 to the sections 9 and 11, and end gates 15.

The section 10 forms the mid-section of the bottom to which longitudinally extending angle iron frame members 16 are secured adjacent its edges and to which transversely extending angle iron braces 17 are secured at its ends, said braces extending beyond the side edges of said section 10.

The inner edges of each of the sections 9 and 11 are connected to the section 10 by hinges 18 secured to said edges and to the outer sides of the frame members 16. The sections 9 and 10 are reinforced at their inner edges by horizontally extending angle irons 19 and at their outer edges by longitudinally extending angle irons 20. Said sections 9 and 11 are also reinforced at their ends by angle irons 21.

Brackets 22 are riveted to each of the irons 20 and are each provided with ears 23 receiving a bolt 24 upon which a spring hanger bracket 25 is pivotally mounted but which may be secured against turning by clamping it to the bracket by means of a stud 26 carried by an eccentric boss 27 and carrying a wing nut 28 and lock washer 29, said nut, when secured down, holding the boss in the position shown in Fig. 6, the bracket and iron 20 having suitable alined slots to permit the stud to assume the position shown. Each bracket 22 has spring links 30 connected thereto by a pin 31 held in place by cotter pins 32, and the other ends of said links carry a pin 33 similarly held to the links.

A set of leaf springs 34 of usual construction have their ends connected to the pins 33 of each set of spring hangers. By loosening the nuts on the studs 26 the spring hangers together with the springs 34 may be turned down adjacent the sections 9 and 11, as shown in Fig. 3.

The ends of the sides 12 and 13 and the angle irons 21 are provided with suitable studs carrying wing nuts 35, and the end gates 15 with openings for these studs so that tightening of the nuts 35 against the end gates secures them to the sides and sections 9 and 11 of the bottom and adjacent the braces 17, and thus the whole body structure is held in assembled operative condition. The removal of the end gates allows the sides 12 and 13 to be folded up against the sections 9 and 11, respectively, and these sections to be folded down at right angles to the mid-section 10, as shown in Fig. 3, and the end gates may then be laid against the sides and bound thereto.

The running-gear includes the springs previously referred to, an axle 36, wheel spindles 37 and wheels 38 journalled on said spindles.

The axle 36 has a fitting 39 secured to each end provided with a forked portion 40 and a spring pad portion 41 in which studs 42 are mounted. The mid-portions of the springs 34 are clamped to the pads by plates 43 fitting onto said studs and secured against the springs by nuts 44. In collapsing the structure the removal of the nuts 44 frees the springs from the axle and permits of their folding up with the body. The forked portions 40 carry pins 45 upon which the wheel spindles 37 are pivotally mounted so that when the axle is detached from the body the wheels may be folded flat against the axle, as shown in Fig. 4. When in assembled condition the spindles 37 are prevented from turning on the pins 45 in each instance by a taper pin 46 which passes through an opening in the spindle as well as a notch 47 in the pin 45, which forms a part of the taper pin opening when the spindle 37 is alined with the axle. Each pin 46 is connected by a chain 48 and cotter pin 49 with fitting 39 to prevent its becoming lost when the running-gear is in knockdown condition. The axle and wheels when in knockdown condition may be laid alongside the knockdown body and the whole knockdown structure may then be bound together to form a compact bundle that may be easily secured to the runnnig-board of an automotive vehicle until it is desired for use.

Any suitable connection between the trailer and vehicle may be used for hauling the trailer behind the vehicle.

I desire it to be understood that this invention is not to be limited to any specific form or arrangement of parts except in so far as such limitations are specified in the claims.

What I claim as my invention is:

1. In a vehicle trailer, the combination of a body having a foldable bottom comprising a mid-section and outer sections hingedly connected to said mid-section, sides hingedly connected to said outer sections and foldable thereagainst, spring hangers pivotally connected to said outer sections, springs connected to said hangers and foldable therewith between said outer sections when the body is collapsed, and end gates having connection with said outer bottom sections and said sides to complete the wagon-box.

2. In a vehicle trailer, the combination of a body having a foldable bottom comprising a mid-section and outer sections hingedly connected to said mid-section, sides hingedly connected to said outer sections and foldable thereagainst, angle irons adjacent the outer side edges of said outer sections, spring hangers pivotally connected to said angle irons, springs connected to said hangers and foldable therewith between said outer sections when the body is collapsed, and end gates having connection with said outer bottom sections and said sides to complete the wagon-box.

3. In a vehicle trailer, the combination, with a collapsible body including longitudinally extending frame members, of spring hanger brackets pivotally connected to said body, locking means engageable with the adjacent frame member for clamping each bracket in operative position, springs, and means connecting the ends of each spring to a pair of said brackets.

4. In a vehicle trailer, the combination, with a collapsible body including longitudinally extending frame members, of spring hanger brackets pivotally connected to said body, a stud for each bracket and a nut mounted on the stud and engageable with the adjacent frame member to clamp the bracket in operative position, springs, and means connecting the ends of each spring to a pair of said brackets.

5. In a vehicle trailer, the combination of a sectional bottom having a mid-section and side sections hingedly connected to said mid-section, angle iron reinforcing frame members extending transversely and longitudinally of said sections, sides hingedly connected to the side sections of the bottom, and end gates removably secured to the sides and bottom and holding them in assembled condition.

6. In a vehicle trailer, the combination of a wagon-box with a sectional bottom having a mid-section and outer sections hingedly connected to said mid-section, reinforcing metal frame members extending transversely and longitudinally of said outer sections, sides hingedly connected to the outer sections of the bottom, springs pivotally connected to said outer sections to fold between them, and end gates, removably connected to said sides and outer sections, completing the wagon-box.

7. In a vehicle trailer, the combination of a wagon-box with a bottom having a mid-section and outer sections hingedly connected together, longitudinally extending angle iron frame members adjacent the outer edges of said outer sections, longitudinally extending frame members on said outer sections adjacent their inner edges, angle iron reinforcing frame members at the ends of and extending transversely of said outer sections, sides hingedly connected to the outer sections of the bottom, springs pivotally connected to said outer sections to fold between them, means for securing the springs in operative position, and end gates removably secured to the sides and bottom and holding them in assembled condition.

In testimony whereof I affix my signature.

ANTON G. GLEISSNER.